May 6, 1952      H. DE BREY      2,596,012
THERMOSTATIC FUEL VALVE CONTROL FOR HOT-GAS ENGINE HEATERS
Filed Sept. 17, 1945
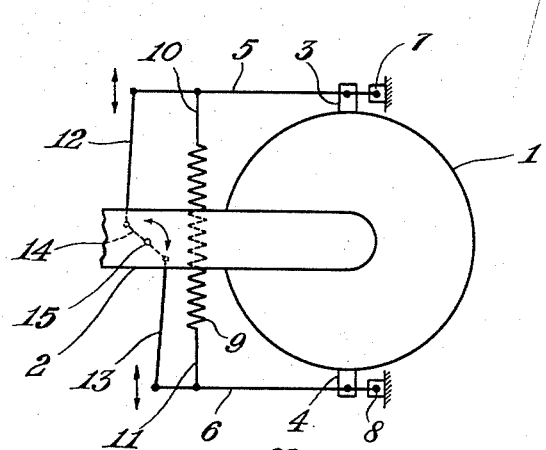
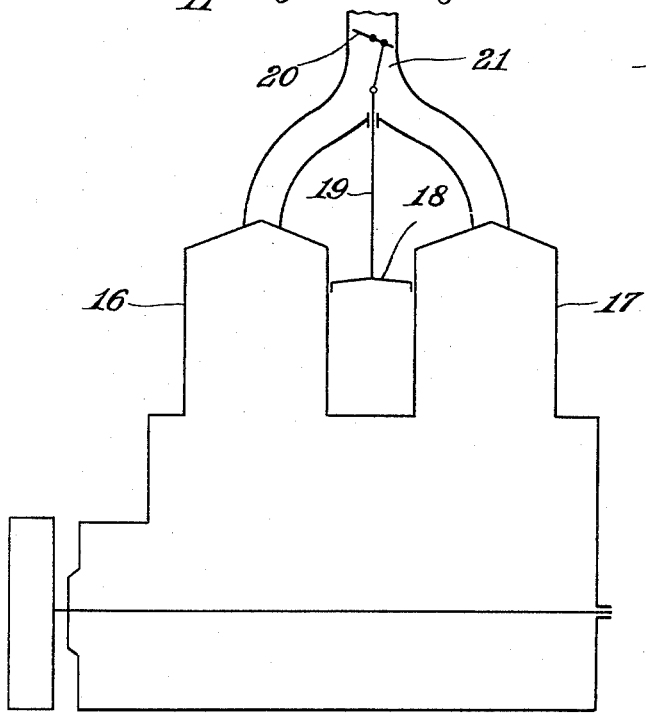
INVENTOR.
HEINRICH DE BREY
BY
AGENT Patented May 6, 1952

2,596,012

UNITED STATES PATENT OFFICE 2,596,012

THERMOSTATIC FUEL VALVE CONTROL FOR HOT-GAS ENGINE HEATERS

Heinrich de Brey, Eindhoven, Netherlands, assignor to Hartford National Bank & Trust Co., Hartford, Conn., trustee Application September 17, 1945, Serial No. 616,926
In the Netherlands June 11, 1945

2 Claims. (Cl. 60—24)

1

This invention relates to a temperature control system for a hot-gas engine.

In hot-gas piston apparatus, such as hot-gas engines, the power output can be regulated by controlling the supply of heat to the engine. The part of the engine taking up the heat of an external source of heat and giving it off to the medium acting in the apparatus, is usually called the heater. For the proposed purpose such apparatus comprise a regulating device for controlling the temperature of the heater, or of the heaters in the case of an apparatus in which more than one complete thermodynamic sequence of operations characteristic of hot-gas engines (i. e. compression, heating, expansion, cooling) takes place as, for example, in a multicylinder engine. It will be obvious that the said regulating device has to be controlled in some way or other.

A primary object of this invention is to provide delicate yet positive thermal responsive regulating means for a hot-gas engine.

A further object of this invention is to provide thermal regulating devices for hot-gas apparatus.

Other objects, features and advantages of this invention will be apparent as the description proceeds hereinafter.

In the drawing:

Fig. 1 is a diagrammatic view in plan of one embodiment of the present invention; and Fig. 2 is a diagrammatic vertical view of another embodiment of the present invention.

The present invention describes a simple mechanism for controlling this regulating device. The hot-gas piston apparatus according to the present invention exhibits the feature that this regulating device is controlled by the thermal expansion of the heater or heaters, which takes place during operation of the apparatus. In this way one obtains a reliable control mechanism of the regulating device. If the hot-gas piston apparatus comprises two or more heaters, the mechanism for controlling the regulating device, in another form of construction of the invention, may comprise an element, e. g., a strip consisting of elastic material which, in the cold state of the apparatus, is so clamped between two heaters of the apparatus as to be gently curved.

In order that the invention may be more clearly understood and readily carried into effect it will now be described more fully with reference to the accompanying drawing.

Fig. 1 represents diagrammatically a plan of the heating of a hot-gas engine, the heater of this engine bearing the reference numeral 1.

2

Through the duct 2 the fuel is supplied to this heater. The wider part of the heater is embraced by two members 3 and 4 that are hinged to the rods 5 and 6. At 7 and 8 these rods hinge about fixed points of the cold part of the engine construction. The rods 5 and 6 are drawn together by the spring 9 which is stretched between rods 10 and 11 which are partially attached to rods 5 and 6 respectively. Furthermore the rods 5 and 6 have pivotally secured to them rods 12 and 13, each of which applies a force at one end of a rod 14. The latter rod 14 is rotatable about a shaft 15 to which is secured a valve (not shown) which is placed in the fuel supply duct. From the drawing it appears that if the rods 5 and 6 are moved away from each other the rod 14 in the drawing acquires a more vertical position, with the result that the valve in the fuel supply duct is partially closed. During this movement of the rods 5 and 6 the spring 9 is stretched. The rods 5 and 6 are moved away from each other due to expansion of the heater 1, since the members 3 and 4 are moved away from each other. If the heater gets colder again, which may be due to a smaller supply of fuel, the heater 1 shrinks again, due to which the members 3 and 4 are drawn together again by the spring 9, which results in moving the rods 5 and 6 together. Due to this the rod 14 is given a more horizontal position and the valve in the fuel supply duct is opened more.

Fig. 2 represents diagrammatically or schematically a two-cylinder hot-gas engine, in which the reference numerals 16 and 17 denote the two heaters. Between these heaters a strip 18 of elastic material, for instance spring steel, is so clamped as to be gently curved. In the cold state of the heaters the strip 18 is a little longer than the distance between the two heaters. Upon the heaters getting hot during operation of the engine the distance between the two heaters becomes smaller which, of course, is due to the thermal expansion of these two heaters. This results in making the middle of the strip 18 rise over a path exceeding several times the decrease in distance between the heaters 16 and 17. In this way a very delicate mechanism is obtained which responds to the expansion of the heaters. To the middle of the strip 18 is secured a rod 19 which is coupled with a valve 20 in the fuel supply duct 21. This valve is impelled by the expansion of the heater in such a manner that the fuel supply to the heaters is reduced. Upon cooling of the heaters the distance between those parts of the two heaters 16 and 17 to which the strip 18 is secured increases again, due to which the strip 18 is straightened again and the supply of fuel through the intermediary of the rod 19 is increased again.

What I claim is:

1. A device of the character described in combination with heater means including at least one valve, which heater means are subject to expansion and contraction, and means including a strip of elastic material gently bowed between two of said heater means while in a mutually cold state for coupling said valve to said heater means in a highly amplifying sense whereby positive movement of said valve on expansion and contraction of said heater means is facilitated.

2. A device of the character described in combination with at least two engine heaters and fuel supply means including a valve, a flexible strip fixedly arched in place between said heaters during their substantially cold state, and coupling means connected to a midpoint of said strip and to said valve whereby thermal changes in either one of said heaters is compensated for by positional changes of said valve.

HEINRICH DE BREY.

REFERENCES CITED

The following references are of record in the file of this patent:

UNITED STATES PATENTS

| Number | Name | Date |
| --- | --- | --- |
| 289,482 | Wilcox | Dec. 4, 1883 |
| 1,037,842 | Creuzbaur | Sept. 3, 1912 |
| 1,574,132 | Smyser | Feb. 23, 1926 |

FOREIGN PATENTS

| Number | Country | Date |
| --- | --- | --- |
| 19,416 | Great Britain | Oct. 16, 1893 |
| 286,782 | Great Britain | Mar. 9, 1928 |